(No Model.)

5 Sheets—Sheet 1.

E. C. HAINES.
MACHINE FOR TOPPING AND WIPING CANS.

No. 568,676. Patented Sept. 29, 1896.

Witnesses:
Murray C. Boyer
Hamilton D. Turner

Inventor:
Edward C. Haines
by his Attorneys
Howson & Howson (No Model.)
5 Sheets—Sheet 2.
E. C. HAINES.
MACHINE FOR TOPPING AND WIPING CANS.
No. 568,676. Patented Sept. 29, 1896.
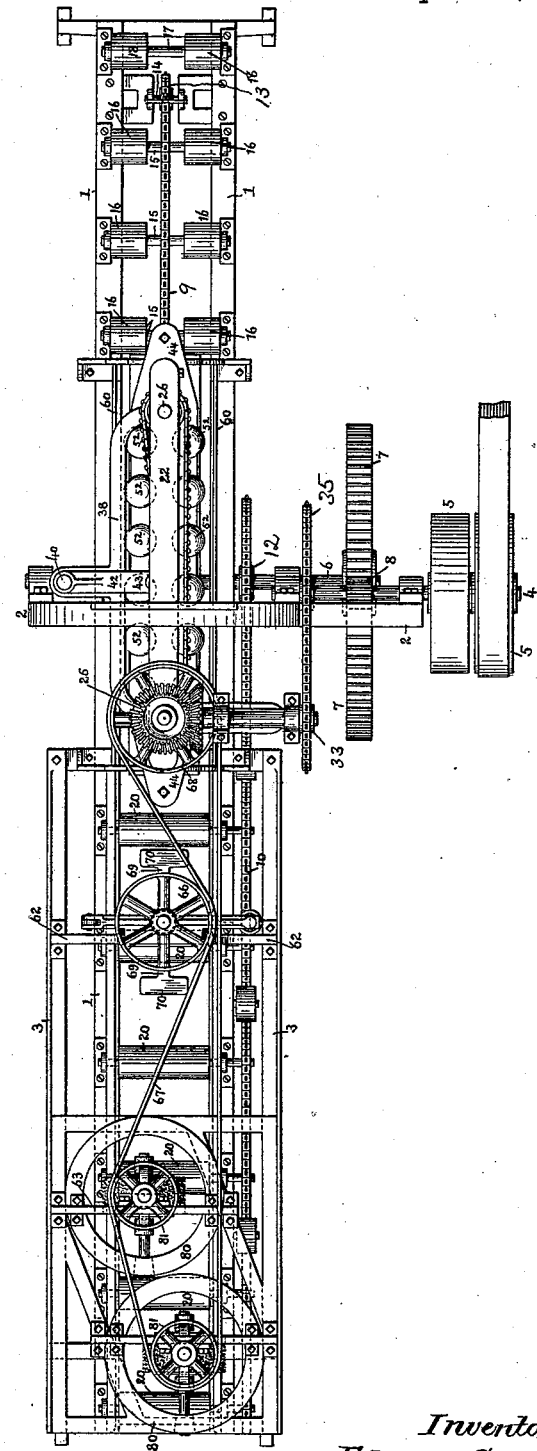
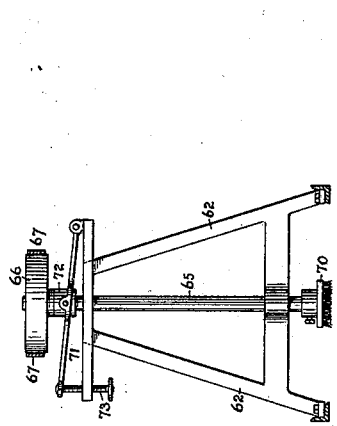
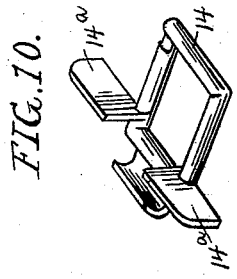
Witnesses:
Murray C. Boyer
Hamilton D. Turner
Inventor:
Edward C. Haines
by his Attorneys
Howson & Howson (No Model.) 5 Sheets—Sheet 3.
E. C. HAINES.
MACHINE FOR TOPPING AND WIPING CANS.
No. 568,676. Patented Sept. 29, 1896.
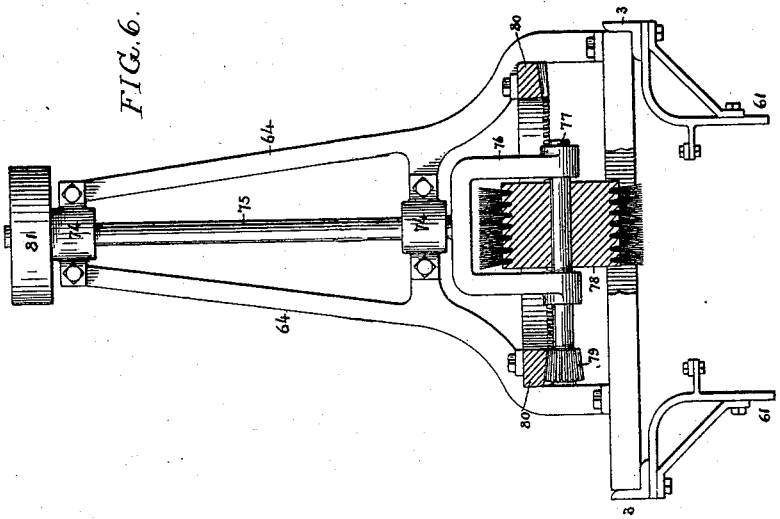
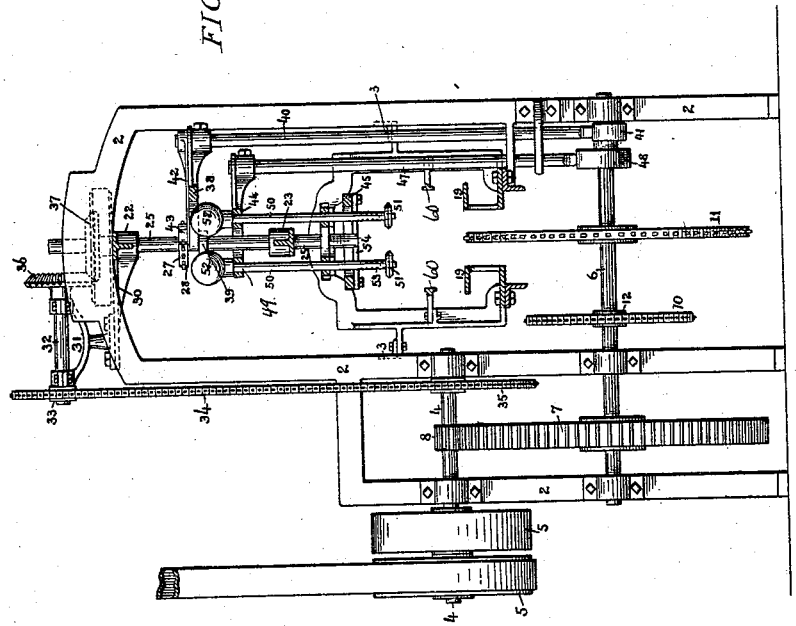
Witnesses:
Murray C. Boyer
Hamilton D. Turner
Inventor:
Edward C. Haines
by his Attorneys
Howson & Howson

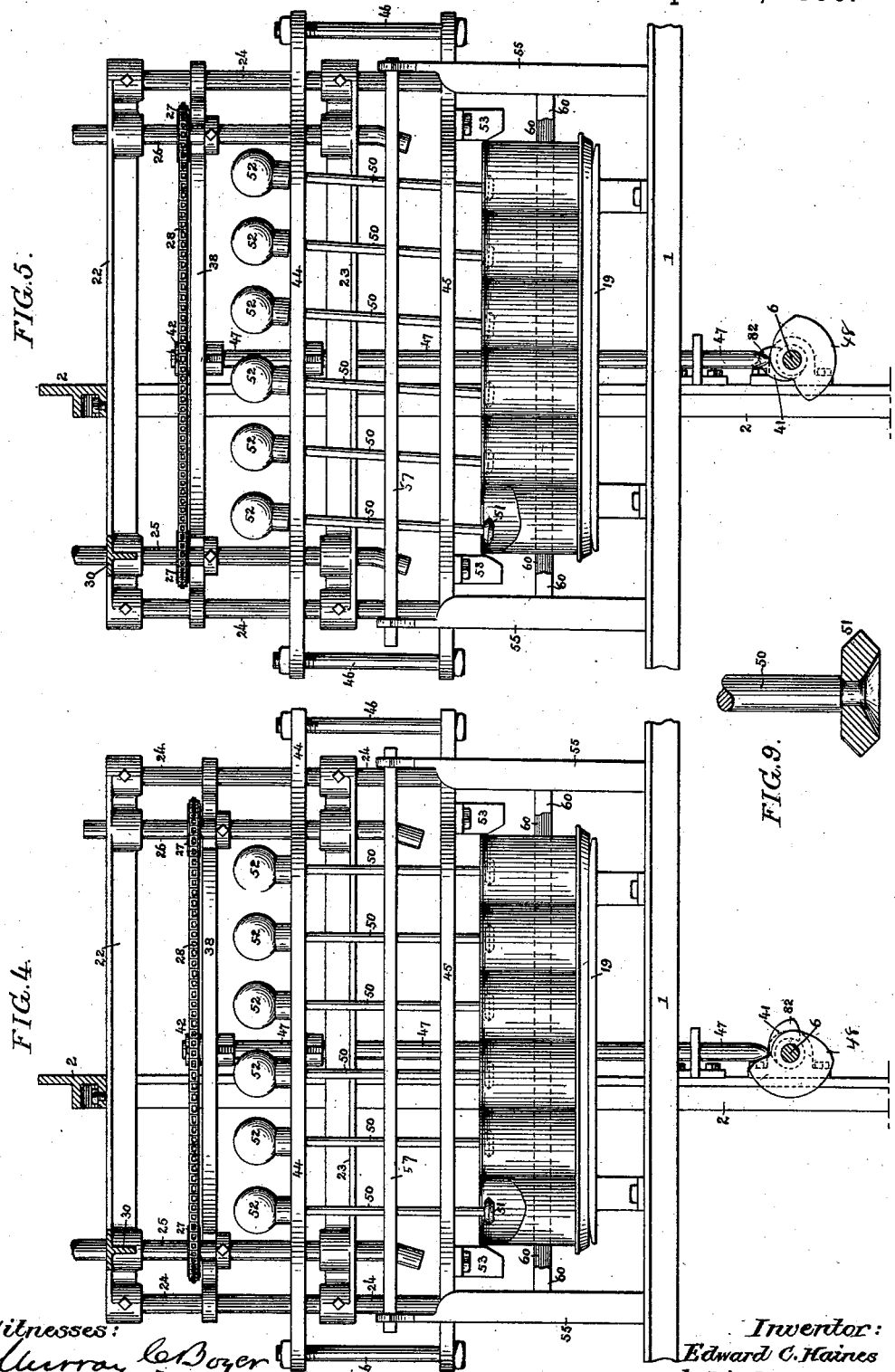

(No Model.)  5 Sheets—Sheet 5.

E. C. HAINES.
MACHINE FOR TOPPING AND WIPING CANS.

No. 568,676. Patented Sept. 29, 1896.

Witnesses:
Murray C. Boyer
Hamilton D. Turner

Inventor:
Edward C. Haines
by his Attorneys
Howson & Howson

UNITED STATES PATENT OFFICE.

EDWARD C. HAINES, OF WOODSTOWN, NEW JERSEY.

MACHINE FOR TOPPING AND WIPING CANS.

SPECIFICATION forming part of Letters Patent No. 568,676, dated September 29, 1896.

Application filed February 16, 1893. Serial No. 462,626. (No model.)

*To all whom it may concern:*

Be it known that I, EDWARD C. HAINES, a citizen of the United States, and a resident of Woodstown, Salem county, New Jersey, have invented Improvements in Machines for Topping and Wiping Cans, of which the following is a specification.

The object of my invention is to provide a machine for removing or pressing within cans which have been filled with vegetables or fruit the excess of material with which the can is filled, and, further, to clean and wipe the upper surface of the can in order that the top may be soldered thereon without difficulty. Heretofore these operations, which have been termed "topping" and "wiping," have been done entirely by hand, and the work has been necessarily slow and incomplete.

Figure 1:
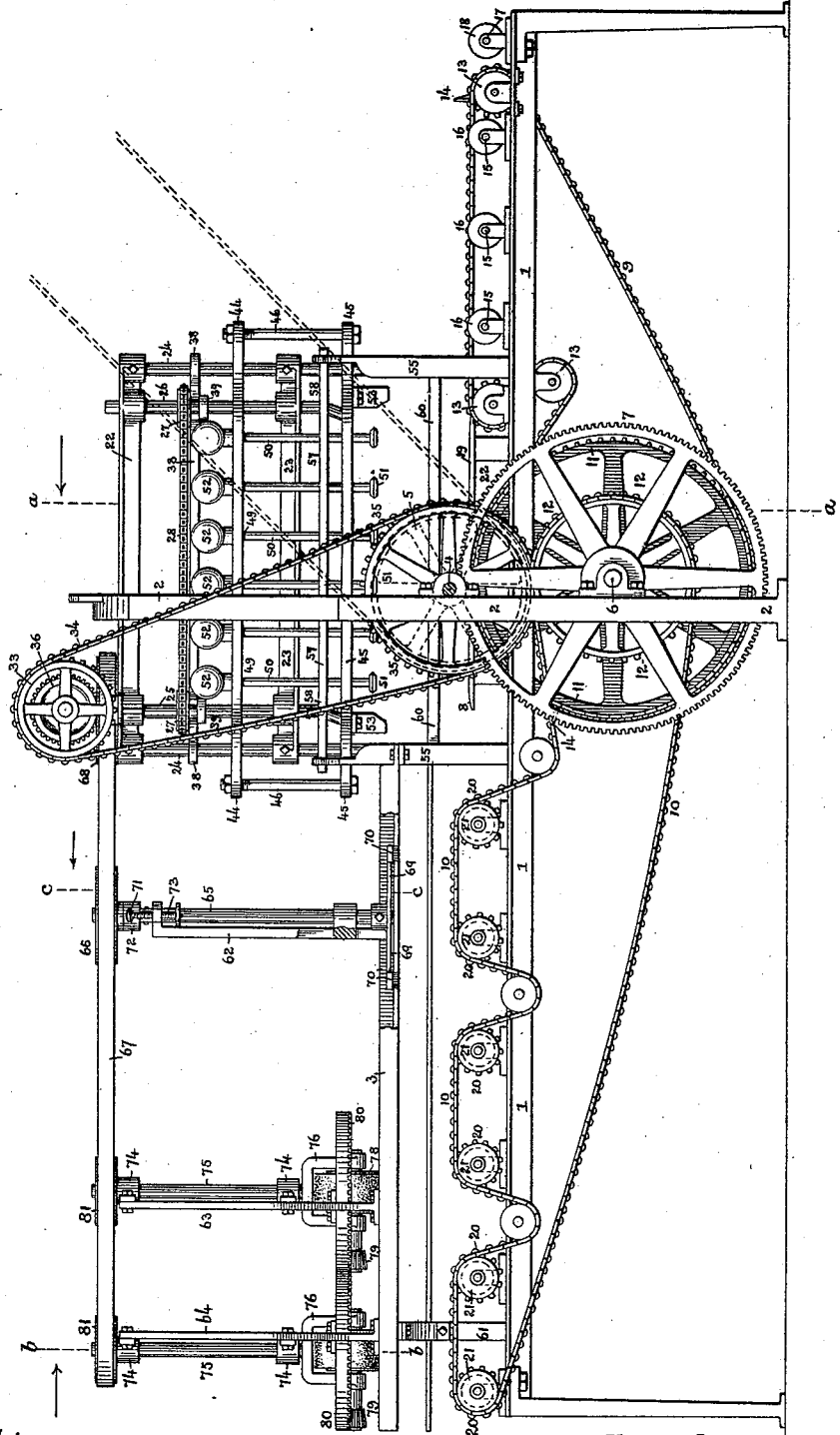
Figure 7:
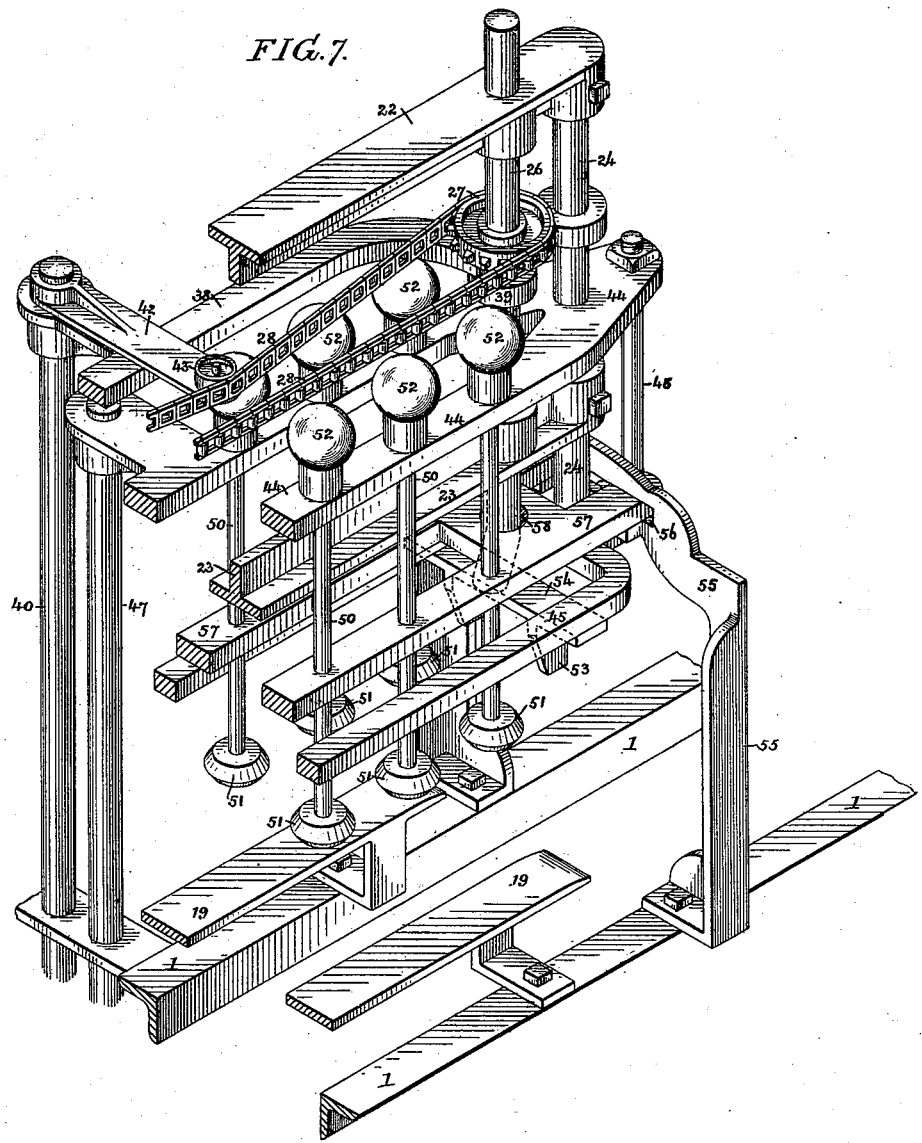

In the accompanying drawings, Figure 1 is a side elevation of a machine for topping and wiping cans constructed in accordance with my invention. Fig. 2 is a plan view of the same. Fig. 3 is a transverse section on the line *a a*, Fig. 1. Figs 4 and 5 are side elevations, on a somewhat larger scale, of portions of the machine, showing the parts in different positions. Fig. 6 is a transverse section on the line *b b*, Fig. 1, but on a somewhat larger scale. Fig. 7 is a sectional perspective view of a portion of the machine. Fig. 8 is a transverse section on the line *c c*, Fig. 1. Fig. 9 is a sectional view of one of the topping-irons, and Fig. 10 is a perspective view of a detail of the mechanism.

The machine is adapted to act upon a number of cans at the same time, and the cans are by preference placed on trays, which are fed through the machine by any suitable conveying mechanism, the trays being stopped at a suitable point in the machine and there acted upon by the topping-irons and after the completion of this operation are again started and traversed beneath brushes, which remove all of the filling material which may remain upon the top of the can and deliver the trays of cans at the opposite end of the machine in proper condition for soldering.

Referring to the drawings, 1 represents the main frame of the machine, comprising a suitable horizontal body provided with supporting-legs; 2, a supplemental frame on which the main shafts of the machine and a portion of the topping-iron supports are carried, and 3 the brush-supporting frame, on which are mounted a number of supplemental frames carrying revolved brushes, beneath which the cans are traversed.

Mounted on suitable bearings on the frame 2 is the main driving-shaft 4, on one end of which are fast and loose pulleys 5 5, connected by a belt to any suitable source of power, and from this shaft all of the moving parts of the machine are operated. Mounted also in bearings on the frame 2 is a transverse shaft 6, carrying a gear-wheel 7, meshing with the pinion 8 on the shaft 4, and from this shaft 6 are driven two link belts 9 10, which pass, respectively, over sprocket-wheels 11 12, mounted on the shaft 6, the link belt 9 being guided over wheels 13 and being provided at suitable intervals with special links 14, having notched blades $14^a$, (shown clearly in Fig. 10,) which engage with and move the trays of cans to a position where they may be operated upon by the topping-irons, the belts, as shown more clearly in Fig. 2, passing over a series of shafts 15, on which are mounted rolls 16, which support the trays as they are forced along by the blades $14^a$ on the link belt 9, and for convenience in feeding the trays to the machine there is provided at the feed end a shaft 17, on which are mounted rolls 18, by means of which the trays may be given their first start in the machine and more easily fed to a position where they may be acted upon by the traversing belt. This traversing belt 9 feeds the tray to a table 19, on which it remains during the topping operation, the blade $14^a$, which has traversed the tray, passing down out of engagement therewith over one of the guiding-rolls 13, and the tray remains in this position until a second tray, fed into the machine in a similar manner, comes into contact therewith and forces the first tray into engagement with the first of a series of rolls 20, which are each provided with a sprocket-wheel 21, over which passes the link belt 10, and the tray is fed through the machine at a somewhat slower speed and is acted upon by the wiping-brushes as it moves toward the discharging-point.

Referring now to Figs. 3 and 7, 22 and 23 are longitudinal supporting-bars united at their opposite ends by vertical posts 24, the upper bar being hung from the frame 2 and the two bars being provided with bearings for vertical shafts 25 26, on which are mounted sprocket-wheels 27, connected by a link belt 28. On the upper bar 22 is a bracket 30, carrying bearing-supports 31 for a shaft 32, on one end of which is mounted a sprocket-wheel 33, connected by a link belt 34 with a sprocket-wheel 35 on the main shaft 4, and on the opposite end of the shaft 32 is a bevel-gear 36, meshing with a bevel-gear 37, feathered to the shaft 25 in such manner that the shaft 25 may be raised or lowered without disengaging the gear. Guided vertically on the posts 24 is a bar 38, through which the shafts 25 and 26 pass, the shafts being held vertically by collars 39, secured to the shafts immediately below the bar, and the sprocket-wheels 27, which are secured to their shafts immediately above said bar. The bar 38 is connected at or about its central portion to a vertically-guided post 40, the lower end of which rests upon and is moved vertically by a cam 41 on the shaft 6, so shaped that the bar and the shafts 25 26 carried thereby will be raised and lowered at each rotation of the shaft 6. The upper end of the post 40 carries an arm 42, on the outer end of which is an antifriction-roller 43, acting to keep the link belt 28 taut.

Guided vertically on the posts 24 is the topping-iron frame comprising upper and lower frames 44 45, connected at their outer ends by bolts 46, and the upper frame being secured to a vertically-guided post 47, the lower end of which rests upon and is under the control of a cam 48 on the shaft 6. The upper frame 44 comprises two parallel bars provided with orifices 49, through which pass the shanks 50 of the topping-irons 51, the orifices 49 having rounded edges, so as to permit a wabbling movement of the shank and iron, and the upper end of each iron being provided with a weight 52, by which the iron is forced into the open mouth of the can. The lower frame 45 is open, as shown, and carries centering-blocks 53, having tapering sides which are adapted to engage with the first two and the last two cans on the tray as the frame is lowered and thus center the cans, so that the open mouth of each can will be exactly under its proper topping-iron. These centering-blocks 53 are connected by transverse cross-pieces 54, which, if desired, may be formed integral with the centering-blocks, and are so arranged that in the event of the tray of cans not being fully fed up to the table 19 the bar or the centering-blocks shall come in contact with the tops of the cans and prevent the further descent of the topping-iron frame and avoid any injury to the irons.

The irons proper are of a construction more clearly shown in Fig. 9, and are circular in form, having their peripheries beveled in opposite directions, so as to facilitate their entrance to and removal from the cans, and the under side of the iron is concave in form, so that as it enters the can the material with which the can is filled will be forced partly up into this concave portion and will not be crowded out of the can.

On the longitudinal bars 1 of the main frame are frames 55, which are slotted at 56 and adapted to receive a frame 57, comprising opposite side bars having orifices through which the shanks of the topping-irons pass, and this strip receives a gyratory or wabbling motion which gives the same movement to the lower ends of the irons, the upper ends of the irons being supported by the frame 44 and the necessary movement being given to the frame 57 by inclining the ends of the shafts 25 26 and passing such shafts through suitable orifices 58 in the strip, so that as the shafts are rotated the strips will be moved and the irons 51 moved round and round in the can, pressing the contents down and away from the mouth and forming a clear space for some little distance under the opening in the can-top, so that when the top of the can is being soldered the contents of the can will not act to chill the solder.

The bar 38, which carries the shafts 25 26, is so timed as to raise the shafts into operative position after the topping-irons have been lowered into the cans.

If desired, the cans may be centered transversely by guiding-bars 60, extending between the frames 55 and placed one on each side of the tray, so as to act either upon the sides of the tray or upon the cans, and the tray may for this purpose be provided with guiding-rollers, so that it may be centered more readily.

3 3 represent the opposite side bars of the brush-supporting frame, which is mounted upon uprights 61, extending from the table 1, and on this frame are supplemental frames 62, 63, and 64, the former having bearings for a vertical shaft 65, on one end of which is a belt-wheel 66, driven by a belt 67, extending around a driving-pulley 68, mounted on the shaft 25.

On the lower end of the shaft 65 are two arms 69, and on the outer end of each arm is adjustably secured a brush 70, the lower or brushing faces of which are on a line with the tops of the cans and serve to clean the latter as they are fed through the machine.

At the upper portion of the frame 62 is pivoted a lever 71, connected at or about its central portion to a collar 72 on the shaft 65, the opposite end of the lever being under the control of a handled adjusting-screw 73, passing through the upper portion of the frame 62, so that the brushes may be raised or lowered as they wear away or when new brushes are to be placed in position on the arms 69.

In the frames 63 64 are bearings 74, in which are mounted two vertical shafts 75, one directly above each of the rows of cans on the tray, and as in the present instance the tray carries but two rows of cans I have illustrated but two of these shafts, although a greater or less number may be used, if desired. Each shaft 75 carries at its lower end a yoke 76, in which is mounted a shaft 77, carrying a brush 78 and provided at one end with a bevel-pinion 79, adapted to engage with a rack 80, secured to the frames 64, so that as the shaft 75 rotates the brush will be rotated with the shaft 77 and will also be rotated with the shaft 75 as a center, and the top of the can will be brushed in a most effective manner and will be thoroughly cleaned of any of the material which may have escaped the brushes 70.

The upper ends of the shafts 75 carry belt-wheels 81 for the driving-belt 67, and the latter may, if desired, be passed over idlers mounted on the frame and so situated as to cause the belt to be brought into contact with a greater portion of the periphery of the belt-wheels.

The operation of the machine is as follows: The cans being placed on the trays, which in this machine are arranged to hold twelve each, the trays are fed one at time to the belt 9, retraversed by the blade or pin 14ª on said belt to the table 19, being guided transversely by the side bars 60 and remaining on said table during the topping operation. The cam 41 is at this time in its highest position and the bar 44, which holds the topping-irons, is consequently fully raised. The first step in the topping operation is the lowering of the bar 44 with the topping-irons, and this bar carries with it the frame 45, on which are the centering-blocks 53, which extend for some distance below the topping-irons. It will be understood that the cam 41 has an abrupt descending surface, as shown in Fig. 4, which illustrates the position of the parts immediately after the bar 44 has been lowered, the topping-irons descending rapidly and being forced by their weights 52 into the cans, crowding the material down below the top for some distance, the centering-blocks 53 having first acted on the cans at the front and rear of the tray and centered the cans so that the open mouth of a can will be immediately under each of the topping-irons, and in the event of the tray not being fed forward a sufficient distance to permit of the centering operation the centering-block will come into contact with the top of one of the cans and prevent the further descent of the topping-irons and avoid any breakage. The further rotation of the shaft 6 will bring the cam 48 around a sufficient distance to raise the bar 40, and as it rises the inclined or cranked ends of the shafts 25 26 will pass within the orifices in the bar 57 and will cause a wabbling or gyratory movement of the topping-irons within the can, it being noted, however, that before this operation is finished the portion 82 on the cam 41 has slightly raised the topping-irons to the position shown in Fig. 5, where they are immediately under the top of the can and act to force back the contents of the can from beneath the groove which surrounds its open mouth. After the cam 48 passes from beneath the bar 40 the shafts 25 26 are lowered and the topping-irons hang loosely in the cans, assuming a vertical position by gravity, so that as the cam 41 continues to rotate and the post 47 and the topping-irons are raised the irons are drawn out of the mouth of the can, and if not exactly centered will be moved to a central position by reason of their beveled upper edges engaging the mouth of the can. This operation having been completed the next tray has been fed to such a position that its front end will strike the rear of the tray containing the cans acted upon and will force such tray forward until it strikes the first of the feeding-rollers 20, when it will be carried forward beneath the brushes 70, and from thence under the brushes 78, where the cleaning operation is completed and the tray discharged from the machine ready to be capped and soldered.

I claim as my invention—

1. In a machine for preparing filled cans to receive their lids, the topping apparatus comprising a topping-iron, a vertically-movable frame in which said topping-iron is loosely mounted, and a laterally-movable frame through which the shank of the topping-iron passes, and means for moving said frames in such a manner as to cause a gyratory or wabbling movement of the topping-iron, substantially as specified.

2. In a machine for preparing filled cans to receive their lids, the topping apparatus comprising a topping iron or irons, a frame in which said irons are loosely hung, means for effecting the vertical movement of said frame, a laterally-movable frame through which the shanks of the topping-irons pass, and means for operating said frames so as to impart a gyratory or wabbling motion to the topping-irons, substantially as specified.

3. In a machine for preparing filled cans to receive their lids, the topping apparatus, in which are combined, a vertically-adjustable frame, a topping iron or irons having weighted shanks adapted to such frame, and devices for giving to the shanks of the topping-irons a gyratory or wabbling motion, substantially as specified.

4. A topping-iron comprising a circular disk-like body having beveled upper and lower edges, a shank and a weight on said shank, substantially as specified.

5. The combination in a machine for preparing filled cans to receive their lids, of the topping-irons, means for operating the same, centering-blocks extending below the under surface of the topping-irons and having beveled faces adapted to act upon the cans, with devices for effecting the vertical movements of such centering-blocks, substantially as specified.

6. The combination in a machine for preparing filled cans to receive their lids, of a series of topping-irons, a vertically-movable bar in which said topping-irons are hung, a frame, as 57, having orifices through which the shanks of such topping-irons pass, and a shaft or shafts having inclined or cranked portions adapted to engage with and operate said frame, substantially as specified.

7. The combination in a machine for preparing filled cans to receive their lids, of the frame, a series of topping-irons, weighted shanks thereon, a movable supporting-bar through which the shanks of the topping-irons pass, vertically-movable shafts, as 25 and 26, having inclined or cranked portions thereon, and a frame, as 57, through which the shanks of the topping-irons pass and with which the inclined portions of said vertically-adjustable shafts are adapted to engage, substantially as described.

8. The combination in a machine for preparing filled cans to receive their lids, of the vertically-adjustable frame composed of the bars 44 and 45, guiding-posts therefor, topping-irons hung to said bar 44, centering-blocks carried by said bar 45, a frame, as 57, through which the shanks of the topping-irons pass, shafts 25 and 26 having cranked portions adapted to engage with said frame 57, a post, as 40, for effecting the vertical movement of said shafts, and devices for rotating the same, substantially as specified.

9. The combination in a machine for preparing filled cans to receive their lids, of the weighted topping-irons, mechanism for vertically operating the same and for effecting the wabbling of said irons, a supporting-table, a series of supporting-rollers forming a track for the can-trays, and a feed-chain for effecting the movement of the trays, substantially as specified.

10. The combination in a machine for preparing the tops of filled cans to receive their lids, comprising a frame carrying a series of topping-irons, a brush-carrying frame, and a table for supporting said frames, of a rotated brush adapted to engage with the tops of the cans after they leave the topping-iron frame, and means for traversing said cans from beneath the topping-irons to a point where they may be acted upon by said rotated brush, substantially as specified.

11. The combination in a machine for preparing the tops of filled cans to receive their lids, comprising a frame for carrying the topping-irons, and a transversely-arranged brush-carrying frame, of devices for moving the cans away from the topping-irons, a brush mounted in said brush-carrying frame adapted to be brought into contact with the tops of the cans as they are moved away from the topping-irons and devices for rotating said brush, substantially as specified.

12. The combination in a machine for preparing filled cans to receive their lids, comprising the topping-iron frame, the brush-carrying frame, and a supporting-table for the cans upon which said frames are mounted, of a series of rollers forming a continuation of that portion of the supporting-table immediately below the topping-irons, a rotated brush adapted to be brought into contact with the tops of the cans as they are moved forward on said rollers, and devices for effecting the vertical movement of the brush, substantially as specified.

13. The combination in a machine for preparing filled cans to receive their lids, comprising a topping-iron frame and a brush-carrying frame mounted on the can-supporting table, of a series of feed-rollers forming a continuation of that part of the supporting-table immediately below the topping-irons, a rotated brush adapted to be brought into contact with the tops of the cans as they are traversed by the feed-rollers, and a rotated arm to which said brush is attached, substantially as specified.

14. The combination in a machine for preparing filled cans to receive their lids, of a supporting-table, a rotated brush carried by a frame mounted on said table, and adapted to act upon the tops of the cans, and devices for revolving the said brush on a line at right angles to its axial movements, substantially as specified.

15. In a machine for preparing filled cans to receive their lids, a rotated brush for wiping the cans, comprising the circular brush-body, a horizontal axis on which said brush is rotated, and devices for revolving said brush and its axis in a line at right angles to the line of horizontal rotation of said brush, substantially as specified.

16. In a machine for preparing filled cans to receive their lids, the combination with a supporting-table for the cans, of a vertical supporting-shaft, as 75, devices for rotating the same, a yoke mounted on the lower end of said shaft, a shaft, as 77, mounted in said yoke, and a circular brush mounted upon and rotated with said shaft 77, substantially as specified.

17. The combination in a machine for preparing filled cans to receive their lids, of the mechanism for wiping the cans, comprising the vertically-rotated shaft, as 75, a yoke mounted on the lower portion of said shaft, a horizontal shaft, as 77, mounted in bearings in said yoke, a brush carried by said shaft, a bevel-pinion, as 79 on said shaft 77 and a stationary rack with which said bevel-pinion is adapted to engage, substantially as specified.

In testimony whereof I have signed my name to this specification in the presence of two subscribing witnesses.

EDWARD C. HAINES.

Witnesses:
MURRAY C. BOYER,
JOSEPH H. KLEIN.